United States Patent [19]

Förster

[11] Patent Number: 5,002,481
[45] Date of Patent: Mar. 26, 1991

[54] APPARATUS FOR GENERATING A COMBUSTIBLE GASEOUS MIXTURE

[75] Inventor: Siegfried Förster, Alsdorf, Fed. Rep. of Germany

[73] Assignee: Forschungszentrum Jülich GmbH, Jülich, Fed. Rep. of Germany

[21] Appl. No.: 311,839

[22] Filed: Feb. 16, 1989

Related U.S. Application Data

[63] Continuation-in-part of Ser. No. 84,337, Aug. 10, 1987, abandoned.

[51] Int. Cl.$^5$ ............................................. F23D 11/44
[52] U.S. Cl. ..................................... 431/208; 431/4; 431/11; 431/210; 431/215; 431/217; 431/242; 431/247; 48/102 A; 48/105; 48/214 A
[58] Field of Search ............. 431/4, 11, 208, 210, 431/211, 212, 215, 217, 239, 242, 247; 48/63, 64, 75, 102 A, 105, 95, 214 R

[56] References Cited

U.S. PATENT DOCUMENTS

| | | | |
|---|---|---|---|
| 197,604 | 11/1877 | Coleman . | |
| 746,409 | 12/1903 | Turner | 431/212 |
| 832,461 | 10/1906 | Dunn | 431/211 |
| 883,373 | 3/1908 | Akeson | 431/212 |
| 1,095,904 | 5/1914 | Matthews | 431/211 |
| 1,399,285 | 12/1921 | Ayres | 48/95 |
| 1,419,223 | 6/1922 | Chapman | 431/160 |
| 1,846,939 | 2/1932 | Benjamin | 431/211 |
| 1,973,456 | 9/1934 | Wilson | 431/217 |
| 3,199,568 | 8/1965 | Baumanns et al. | 431/217 X |
| 3,291,191 | 12/1966 | Stoops | 431/208 X |
| 3,804,579 | 4/1974 | Wilhelm | 431/211 |
| 4,089,638 | 5/1978 | Trucco et al. | 431/208 X |
| 4,480,172 | 10/1984 | Ciciliot et al. | 431/208 X |

Primary Examiner—Carl D. Price
Attorney, Agent, or Firm—Frishauf, Holtz, Goodman & Woodward

[57] ABSTRACT

Production of oxides of nitrogen during combustion of liquid fuel can be reduced by burning at relatively low temperatures of about 1400° C., by first producing a special combustible gaseous mixture of superheated steam, fuel vapor, and combustion air. Water is fed (9) to the apparatus in quantities of about 2 to 4 parts for each part of fuel (10). Then the fuel is vaporized (8) in a stream of the superheated steam. This avoids fuel cracking and formation of long-chain hydrocarbons. Preheated air (13,14,15) is added (17) in slightly over stoichiometric proportions. The resulting mixture is burned (2) and the hot effluent is used to heat the evaporator (6,7,8) and the air preheating chamber (15), with a bypass (20) equipped with a throttle (22) being used for regulation of evaporator temperature. For start-up, an external hot air source (23) or electric heat (24) can be used. The remaining heat in the effluent can be captured in a conventional heat exchanger. Preferably, mixing occurs in a chamber (3) located on the opposite side of the combustion chamber (2) from the evaporator (6) and the air preheating chamber (15).

9 Claims, 1 Drawing Sheet

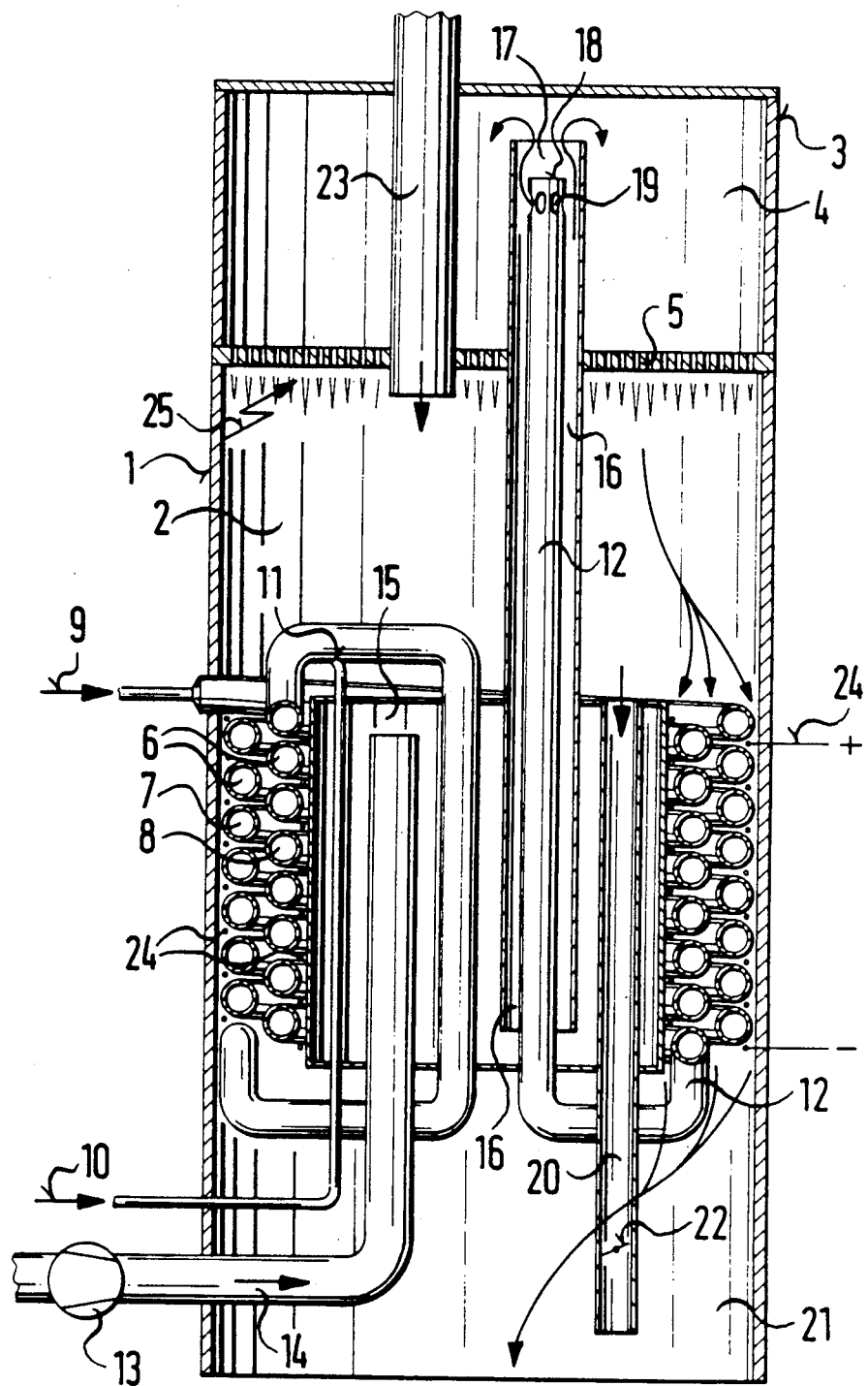

APPARATUS FOR GENERATING A COMBUSTIBLE GASEOUS MIXTURE

This application is a continuation-in-part abandoned of application Ser. No. 084,337, filed Aug. 10, 1987, which corresponds to German application DE-OS 36 26 933, published Feb. 18, 1988.

Cross reference to related patent, assigned to the assignee of the present invention: U.S. Pat. No. 4,486,362, FORSTER et al., granted Dec. 4, 1984, the disclosure of which is hereby incorporated by reference.

The invention relates generally to the production of a combustible mixture of fuel vapor, water vapor, and combustion air by vaporization of liquid fuel and mixing with the air, and, more particularly, to an improved method and apparatus for vaporizing the fuel.

BACKGROUND

It is known to vaporize heating oil by application of vaporization energy and to subsequently mix with combustion air. However, complete vaporization of the heating oil requires relatively high boiling temperatures, which cause formation of cracking products. These cracking products comprise primarily cokes, which deposit in the vaporization chamber and are difficult to remove.

My earlier patents, U.S. Pat. No. 4,486,362 and corresponding German Patent DE-PS 31 22 770, further disclose vaporization of liquid fuel in a stream of heated combustion air. Using this method, the fuel can be transferred into the combustion air at significantly lower temperatures. These temperatures, for heating oil, are on the order of half the maximum boiling temperature of the liquid fuel. However, the heating oil reacts with oxygen in the combustion air to form long-chain hydrocarbons which no longer vaporize in the combustion air at the aforementioned low temperature level. Thus, even according to this method, there remains an unprocessible oil residue.

THE INVENTION

Accordingly, it is an object of the present invention to produce by vaporization a combustible gaseous mixture without obtaining residues in the vaporization space in the form of deposited cracking products or long-chain hydrocarbons. Another object is to completely vaporize the fuel, while avoiding changes in its chemical consistency.

Briefly, the present invention vaporizes one part of fuel together with several parts of water in the form of steam, and feeds the resulting vapor mixture into the combustion air. It has been found that, as in the case of vaporizing heating oil in combustion air, the present method of vaporizing fuel in steam permits the use of relatively low vaporization temperatures. The substitution of water vapor for combustion air as the heat carrier avoids oxidation reactions in the not-yet-vaporized fuel. The fuel to be processed retains its chemical consistency.

Preferably, in producing the fuel/water vapor mixture, a quantity of water is vaporized which is two- to four-fold greater than the quantity of fuel to be vaporized. The optimal range is limited at the lower end because, the less water vapor is used, the higher the temperature of the water vapor must be in order for the water vapor, acting as heat carrier, to vaporize a given quantity of fuel. Higher temperatures present the danger that the fuel will crack. The upper limit for the proportion of water results from the ignition limit of the gaseous mixture formed from the fuel/water vapor and the combustion air.

It is advantageous for the fuel to be vaporized in superheated water vapor. To generate the fuel/water vapor mixture, the water vapor is first produced and superheated, and then the fuel is introduced into the superheated water vapor, so that more than enough vaporization heat for the fuel is supplied by the water vapor. Preferably, the fuel is introduced into water vapor superheated to about 400° C.

The combustion air is preferably preheated before feeding into the fuel/water vapor mixture. In order to maintain the temperature of the fuel/water vapor mixture and to avoid condensation of fuel or water before formation of the combustible gaseous mixture, the combustion air is preheated to the temperature of the fuel/water vapor mixture before combination with it.

Preferably, the warming and vaporization of the water and fuel are accomplished using the hot gas effluent of the combustion of the mixture. The energy required to vaporize the water is recaptured by cooling the effluent in heating up the water and fuel, and in further heat exchange, e.g. in a boiler, down to below the dewpoint or condensation temperature of the water vapor contained in the effluent.

The preferred apparatus, for carrying out the method of the present invention, includes an evaporator for liquid fuel and a mixing chamber, connected downstream thereof, for producing a combustible gaseous mixture. The mixing chamber is equipped with a supply line furnishing combustion air. From the mixing chamber, the combustible gaseous mixture is fed into a combustion chamber. Various inventive features of this apparatus are set forth below.

One significant feature is the evaporator for fuel and water, which is connected upstream of the mixing chamber and whose outlet is connected to a fuel/water vapor line, which issues into the mixing chamber for production of the combustible gaseous mixture. In order to vaporize the fuel in superheated water vapor, the evaporator has two vaporizing portions. The first portion serves exclusively to vaporize the water; the second, into which the water vapor from the first streams, serves to vaporize the fuel. The heat-exchange surface of the fuel-vaporizing portion is so scaled that its temperature is only slightly above the target temperature for the fuel/water vapor mixture; thus, no temperatures can occur in the fuel which would give rise to cracking products in the fuel.

Preferably, the evaporator is heated by hot gas. As previously noted, it is advantageous to use the hot effluent from combustion of the mixture of fuel vapor, water vapor, and combustion air as the heating gas for the evaporator. One could, of course, use as a heating gas the exhaust from a combustion engine, since such exhaust gases are an acceptable substitute.

The amount of heat energy required for heating the water and fuel is adjusted using a bypass for the heating gas and a flow regulator disposed in the bypass, with which the respective fractions of the gas passing over the evaporator and around the evaporator are regulated. Thus, opening the throttle in the bypass will prevent overheating of the fuel to be vaporized. This may be implemented using a temperature sensor in the evaporator, connected to a servomechanism controlling the throttle. These may be of conventional construction.

In order to facilitate heating of the water, fuel, and combustion air during start-up, electric heating of the evaporator is also provided.

A further feature of the invention is a preheating chamber for the combustion air. Like the evaporator, the preheating chamber is heated by heating gas, but can also be electrically heated, in case heating gas is not available or is not yet available.

Advantageously, the preheating chamber is disposed inside the evaporator to facilitate use of heating gas or electric heating to warm both of them. This arrangment of the preheating chamber inside the evaporator also results in a very compact construction and in optimal utilization of the thermal energy derived from the heating gas or the electrical heating system.

DRAWING

FIG. 1 is a schematic, partially cross-sectional view of the vaporization, mixing, and combustion apparatus of the present invention, broken away at the bottom outlet leading to conventional heat recovery devices (not shown).

DETAILED DESCRIPTION

FIG. 1 illustrates a cylindrical device with a tubular chamber wall 1. In the upper portion of the device is a combustion chamber 2. Adjacent to combustion chamber 2 is a mixing chamber 3, in which fuel vapor, steam, and combustion air combine in a mixing space 4 to form a combustible gaseous mixture, then pass through a flame grate 5 to enter combustion chamber 2. The combustion gas generated in combustion chamber 2 is fed to a evaporator 6, which serves to produce the fuel/water vapor mixture. The preferred embodiment of evaporator 6 is a generally helical pipe having a first vaporizing portion disposed adjacent chamber wall 1.

In this first vaporizing portion, the water is vaporized and superheated. The output of the first vaporizing portion is connected to a second vaporizing portion 8 whose vaporizing tubes have, in the preferred embodiment, a smaller radius of curvature than the vaporizing tubes of the first vaporizing portion. Therefore, from the viewpoint of the chamber wall 1, these smaller-curvature-radius tubes are disposed further inside evaporator 6 than first vaporizing portion 7. Water for vaporization is supplied to first vaporizing portion 7 through a water supply line 9. Fuel is supplied to second vaporizing portion 8 via a fuel supply line 10, which merges into second vaporizing portion 8 at location 11.

In the preferred embodiment, the liquid fuel is slightly preheated in fuel supply line 10. In second vaporizing portion 8, the fuel evaporates into the steam generated in first vaporizing portion 7. In both vaporizing portions, vaporization occurs in a downward direction in the helical pipes.

The fuel/water vapor mixture, formed in this manner in evaporator 6, flows out of second vaporizing portion 8 via a fuel/water vapor duct 12, whose outlet is in mixing space 4.

The necessary combustion air is supplied, in the preferred embodiment, from a blast pipe 13, and flows through a combustion air duct 14 into a preheating chamber 15. Chamber 15, in the preferred embodiment, is disposed centrally in evaporator 6 within the helical pipe which forms second vaporizing portion 8. Preheating chamber 15 is enclosed on all sides but has one outlet for the preheated air, a combustion air supply line 16 leading into mixing space 4.

In the preferred embodiment, fuel/water vapor duct 12 and combustion air supply line 16 form a double, concentric pipe set, of which the fuel/water vapor duct is the inner pipe. At the mouth of this double pipe, there is a mixer 17 for the gaseous mixture of combustion air and fuel/water vapor which emerges at this point into the mixing space 4. In the preferred embodiment, mixer 17 is formed simply by closing the end face 18 of fuel/water vapor line 12 and providing a plurality of sidewise or radial outlet openings 19 therein, for exit of the fuel/water vapor mixture. As shown, the surrounding combustion air duct 16 of the double pipe preferably extends axially beyond these outlet openings 19, so that the fuel/water vapor mixture streams through openings 19 into the end of air duct 16.

For regulation of the amount of hot gas needed at evaporator 6 for vaporization of water and fuel, a bypass 20 leads from combustion chamber 2 to the hot gas outlet 21 of evaporator 6. As a flow control regulator 22, a throttle vane is disposed in bypass 20, by means of which, one can directly adjust the fraction of the hot gas streaming through bypass 20 and can indirectly adjust the fraction of the hot gas streaming around evaporator 6. A servomechanism can control the throttle.

In case no hot combustion gases from the combustion chamber are available for producing the fuel/water vapor mixture, as may be the case upon starting the apparatus, the evaporator can be heated with hot gas from some other source. This hot gas can be supplied through a supply line 23, shown in FIG. 1 passing through mixing chamber 3 and flame grate 5 into combustion chamber 2. Other possible configurations are readily apparent.

Evaporator 6 can also be heated electrically. FIG. 1 illustrates an electic heater 24 arranged in heat-conductive relation to the helical pipe of evaporator 6. Heater 24 is so arranged that it can heat not only evaporator 6, but also preheating chamber 15 for the combustion air.

For ignition of the gaseous mixture entering combustion chamber 2, there is provided an igniter 25, which may be of any suitable conventional construction and is preferably disposed adjacent to flame grate 5.

OPERATION:

In accordance with a preferred version of the method of the present invention, conventional heating oil is used to produce a combustible gaseous mixture.

EXAMPLE 1

The heating oil is fed in second vaporizing portion 8 into superheated, 400° C. steam. The steam is produced by feeding room-temperature, salt-free water into first vaporizing portion 7, where it is heated. The amount of vaporized water in second vaporizing portion 8 is greater, by a factor of 2 to 4, than the amount of heating oil introduced.

To the resulting heating oil/water vapor mixture, combustion air is added, in slightly over stoichiometric relation to the heating oil. The resulting combustible gaseous mixture streams out of the mixing chamber 3 through flame grate 5 into combustion chamber 2 and is ignited there. Under steady operating conditions, the temperature in the combustion space approximates 1400° C. Combustion effluent gas is fed at this temperature to evaporator 6.

Due to the water vapor contained in the combustible gaseous mixture, lower combustion gas temperatures are reached during combustion than would be without this water vapor. This has the important advantage of reducing production, during combustion, of polluting oxides of nitrogen.

The combustion gases are fed from hot gas outlet 21 to a conventional heat exchanger (not shown) for capture of their thermal energy. The gases can be cooled there down to below the dewpoint or condensation temperature of the accompanying water vapor.

EXAMPLE 2

Heating oil was introduced into steam superheated to 350° C. A portion of the combustion exhaust gases from chamber 2 sufficed to heat up the water vapor in vaporizing portion 7 of evaporator 6. The necessary combustion gas amount was supplied by appropriate adjustment of flow regulator 22 in bypass 20. The water vapor traveled through second vaporizing portion 8 with a flow velocity of about 30 meters per second. The heating oil entered vaporizing portion 8 at 11 and was received in an amount of water vapor which preferably is between 2 ½ and 4 times that of the heating oil. Vaporization of the heating oil and formation of the resulting fuel/water vapor mix took about one-tenth of a second. The fuel/water vapor mixture was fed through combustion air supply tube 16 at about 200° C. The amount of combustion air was selected such that a combustion air/heating oil ratio only a little above the stoichiometric ratio resulted. Thus, the nitrous oxide concentration at hot gas outlet 21 was held to about 50 parts per million with air 2 ½ times oil, and to about 35 parts per million with air 4 times oil.

The pressure of the water vapor in evaporator 6 was between about 0.1 and 0.5 bar higher than that in combustion chamber 2. At this pressure, the water and heating oil could be injected into evaporator 6, for example using gear pumps. The capacity of combustion chamber can, according to the method of the invention, be varied over a wide range, for example by factors from 1 to 10, without degrading the vaporization characteristics or the combustion quality. One needs only adjust the ratios of water, fuel, and combustion air to fixed values corresponding to the chamber capacity.

Those skilled in the art will appreciate that, instead of heating oil, other liquid fuels may be used, such as gasoline or other combustible crude oil products or distillates from bituminous coal or lignite. Numerous other variations and modifications are possible, within the scope of the inventive concept, so the invention is not limited to the single embodiment shown and described, but rather is defined by the claims set forth below.

I claim:

1. Apparatus for producing a combustible gaseous mixture, having
    a water supply line (9) and a liquid fuel supply line (10);
    an evaporator (6) connected to said supply lines (9,10) and vaporizing liquid fuel by introducing (11) said liquid fuel into a stream of water vapor, thereby heating said fuel while substantially avoiding reaction of said fuel with oxygen;
    a mixing chamber (3), having an inlet connected to an outlet of said evaporator (6), mixing vapor and combustion air together to form a combustible mixture, and
    a combustion chamber (2) connected to outlets of said mixing chamber (3),
    an igniter (25) for initiating combustion of said mixture in said combustion chamber (2) to produce hot combustion effluent gases, and wherein said evaporator (6) is heated by hot gases;
    wherein said evaporator vaporizes both water and liquid fuel, and
    a fuel/water vapor line (12) is provided, and feeds a mixture of unoxidized fuel vapor and water vapor from said evaporator into said mixing chamber (3) and further comprising
    means for directing hot gas effluent from said combustion chamber (2) over said evaporator (6);
    a bypass (20) directing a fraction of said hot gas effluent around said evaporator (6); and
    a flow regulator (22) disposed in said bypass (20) and regulating what fraction of said hot gas effluent passes around said evaporator (6) rather than over said evaporator (6).

2. Apparatus according to claim 1, wherein
    said evaporator (6) has first (7) and second (8) vaporizing portions;
    said water supply line (9) supplies water to said first vaporizing portion (7), which vaporizes the water;
    said second vaporizing portion (8) is connected to an outlet of said first vaporizing portion (7) and has an outlet connected to said mixing chamber (3); and
    said fuel line (10) supplies fuel to said second vaporizing portion (8), which vaporizes the fuel in a stream of hot steam coming from said first vaporizing portion (7).

3. Apparatus according to claim 1, wherein
    an electric heater (24) heats said evaporator (6).

4. Apparatus according to claim 1, further comprising
    a combustion air preheating chamber (15) having an air inlet (13, 14) and
    a combustion air duct (16) running from said preheating chamber (15) into said mixing chamber (3).

5. Apparatus according to claim 4, further comprising means for heating said preheating chamber (15) with hot gas effluent from said combustion chamber (2).

6. Apparatus according to claim 4, wherein said fuel/water vapor line (12) passes through said combustion chamber (2) into said mixing chamber (3).

7. Apparatus according to claim 4, wherein said fuel/water vapor line (12) and said combustion air duct (16) are arranged concentrically and together run through said combustion chamber (2).

8. Apparatus for producing a combustible gaseous mixture, having
    a water supply line (9) and a liquid fuel supply line (10);
    an evaporator (6) connected to said supply lines (9,10) and vaporizing liquid fuel by introducing (11) said liquid fuel into a stream of water vapor, thereby heating said fuel while substantially avoiding reaction of said fuel with oxygen;
    a combustion air preheating chamber (15) having an air inlet (13, 14);
    means (24) for heating said preheating chamber (15) electrically;
    a mixing chamber (3), having an inlet connected to an outlet of said evaporator (6), mixing vapor and combustion air together;
    a combustion air duct (16) running from said preheating chamber (15) into said mixing chamber (3), and a combustion chamber (2) connected to outlets of said mixing chamber (3), wherein said evaporator vaporizes both water and liquid fuel, and a fuel/water vapor line (12) is provided, and feeds a mixture of unoxidized fuel vapor and water vapor from said evaporator into said mixing chamber (3).

9. Apparatus for producing a combustible gaseous mixture, having a water supply line (9) and a liquid fuel supply line (10);

an evaporator (6) connected to said supply lines (9,10) and vaporizing liquid fuel by introducing (11) said liquid fuel into a stream of water vapor, thereby heating said fuel while substantially avoiding reaction of said fuel with oxygen;

a combustion air preheating chamber (15) having an air inlet (13, 14);

a mixing chamber (3), having an inlet connected to an outlet of said evaporator (6), mixing vapor and combustion air together;

a combustion air duct (16) running from said preheating chamber (15) into said mixing chamber (3), and a combustion chamber (2) connected to outlets of said mixing chamber (3), wherein said preheating chamber (15) is disposed inside of said evaporator (6), said evaporator (6) vaporizes both water and liquid fuel, and a fuel/water vapor line (12) is provided, and feeds a mixture of unoxidized fuel vapor and water vapor from said evaporator into said mixing chamber (3).

* * * * *